Figure 1:
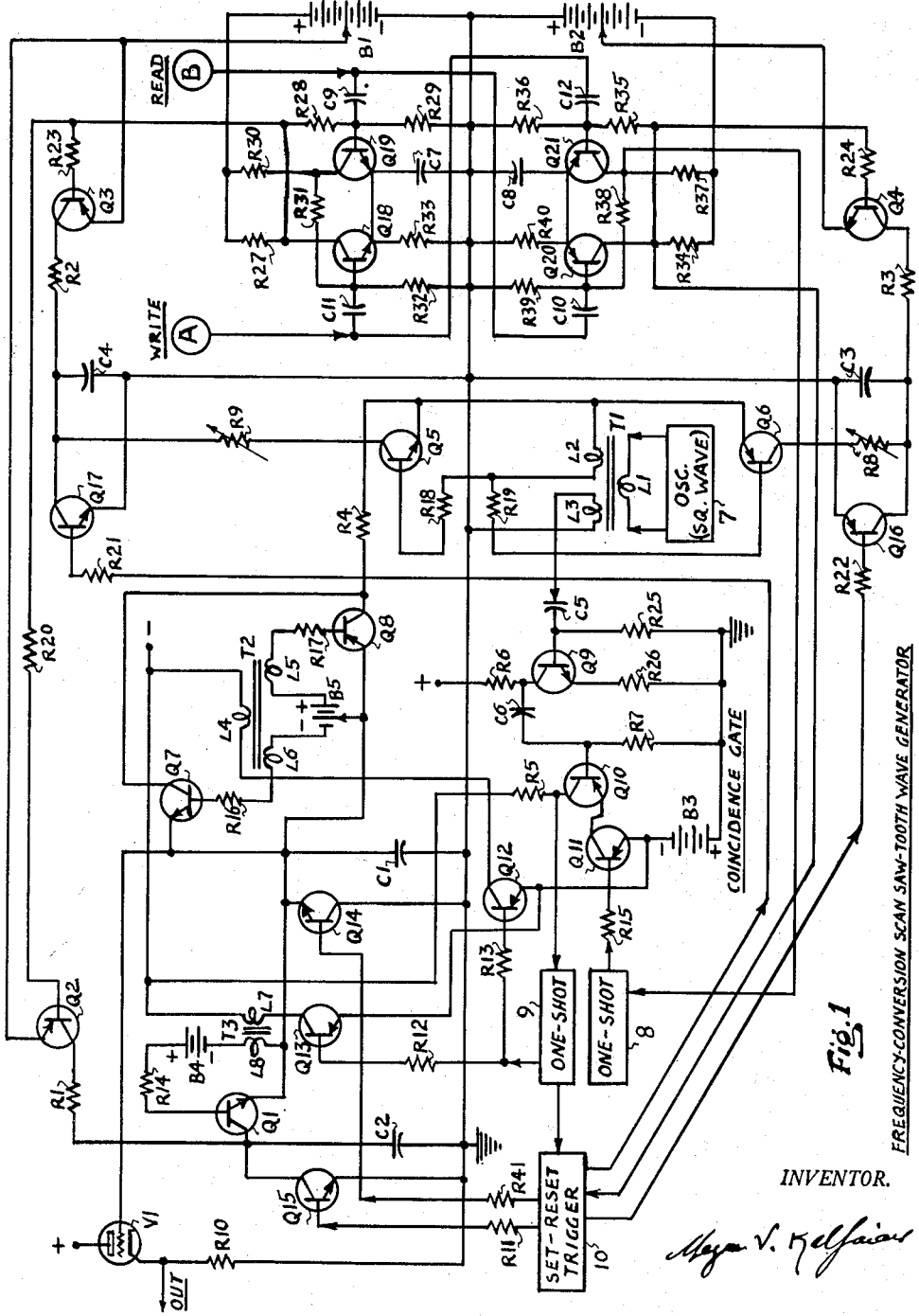

Dec. 10, 1963    M. V. KALFAIAN    3,114,055
SYMMETRIC SAW TOOTH WAVE GENERATOR
FOR FREQUENCY CONVERSION SYSTEMS
Filed June 22, 1961    2 Sheets-Sheet 2

FREQUENCY CONVERSION SCANNING WAVE

INVENTOR.
Megerdich V. Kalfaian

United States Patent Office 3,114,055
Patented Dec. 10, 1963

3,114,055
SYMMETRIC SAW TOOTH WAVE GENERATOR
FOR FREQUENCY CONVERSION SYSTEMS
Meguer V. Kalfaian, 962 Hyperion Ave.,
Los Angeles 29, Calif.
Filed June 22, 1961, Ser. No. 120,142
2 Claims. (Cl. 307—88.5)

This invention relates to frequency conversion systems, and more particularly to a system for producing saw tooth scanning waves for frequency conversion systems. One of its objects is to produce a recording saw tooth scansion wave at a low frequency rate, and produce plurality of reproducing saw tooth waves at a higher frequency rate. Another object is to produce said reproducing saw tooth waves in symmetric forward and backward motion without retrace action between any of the scansion waves. A further object is to produce said recording saw tooth scansion wave at the rate of first constant time base period but in different amplitudes, and produce reproducing saw tooth scansion waves at the rate of a second constant time base period in amplitudes equal to the amplitudes of the recording saw tooth wave. Still another object is to produce the recording saw tooth wave rising from a reference constant level, and produce the reproducing saw tooth waves rising and falling from this reference constant level, in amplitude equal to the recording saw tooth wave. The principle object of the present invention is to provide an electrical circuit arrangement for producing said scansion saw tooth waves. This circuit arrangement is an improvement over the circuit arrangements disclosed in my Patents No. 2,705,260, March 29, 1955; No. 2,708,688, May 17, 1955; No. 2,921,133, Jan. 12, 1960; and copending applications Serial No. 857,121 filed Dec. 3, 1959; and Serial No. 3,350 filed Jan. 19, 1960, now Patent No. 3,054,063.

The circuit arrangement disclosed herein is for the purpose of producing scansion saw tooth wave for recording a complex wave, and producing a plurality of scansion saw tooth waves for reproducing the recorded wave continually a plurality of times. It is assumed herein that during reproduction, retention of the frequency components of the recorded complex wave is of most importance, and that any change in phase of these components is not important. Thus the mode of scanning may be different than conventionally practiced. For example, assume that a complex waveform having equal signal levels at its beginning and ending is recorded along a single line across the screen of a cathode beam type storage tube. When this recorded wave is reproduced several times continuously by conventional saw tooth scanning waves having retrace time lag periods, contiguity between each reproduced waveform is broken by the retrace periods, which may deviate from the original accuracy with regard to frequency components contained; when critical narrow band pass circuits are involved. In a second example, assume that the signal levels commencing and terminating the recorded waveform are widely different. In this case, even if the retrace periods of the scanning waves were zero, there will occur sudden changes in signal level, which when oppositely poled, will cause high filtering action through the associated narrow band pass circuits; this filtering action varying intermediately depending upon the differences in signal levels at the beginning and ending of the recorded waveform.

The recorded complex waveform is herein referred to as representation of some sound intelligence, for example, in speech sound waves. As such recording may be a portion of a repetitious sound wave, to be reproduced continuously at a later time period, for example, after being transmitted through a narrow band transmission channel, it does not matter whether the recorded wave is scanned in forward direction or in a backward direction, or further yet, alternately in forward and backward directions. This condition is true, because intelligence of the sound is not transmitted through phase variations of the wave, but through its various frequency components, which would not alter through the latter mode of scanning. Thus instead of utilizing reproduction scanning saw tooth waves having only forward direction, and including retrace time periods between repetitions, we may use symmetric forward and backward saw tooth waves, with complete elimination of the retrace periods. By such mode of scanning, an associated band pass circuit would not see a sudden change in signal level either at the beginning or at the ending of the recorded waveform, and therefore, avoid filtering action. This latter mode of scansion may not be considered as ideal, because the wave curve at the beginning or ending of the recorded waveform may not be tangential at all times, and the sharp reversal of signal at these points may introduce some unwanted frequency components in the output circuit; but these components will be of small magnitudes in comparison with the effects introduced in conventional mode of scanning, and therefore, they may be considered as negligible. Furthermore, this latter condition will introduce new signals to the original, and not cause any filtering action. And since this newly introduced signal represents a high order of harmonics, the probability is that it will be beyond the region of the original frequency spectrum, and therefore, it can be filtered out.

In the particular embodiment of the present invention, the time period of a waveform to be recorded is not predicted beforehand, and accordingly, the distance of recording, for example, across the screen of a storage type cathode ray tube, may vary widely for each recording. For this reason, and with reference to above given explanation and the advantages with respect to conventional modes of scanning, the present invention contemplates to first provide means for producing a recording saw tooth scanning wave rising from a reference point. During this recording scansion of the incoming waveform, a signal voltage is proportionally derived and stored, the quantity of which represents the time dimension of the recording saw tooth wave; for further control. Further means is provided for producing symmetric scanning saw tooth waves, the amplitudes of which are controlled by said stored quantity, in a manner that, they scan the recorded wave beginning from the same reference point to the ending of the record; and backward alternately. Still further means is provided to stop the reproduction of said recorded wave after a predetermined number of counts.

Briefly in accordance with the embodiments of the present invention, there is provided a method which comprises the steps of producing a recording scanning wave rising in energy from zero value, the maximum level of last said wave representing the time dimension during which said recording occurs; producing repeated reproduction scanning waves at a constant predetermined reference time base period alternately falling and rising in energy coincident with said zero and maximum energy levels of the recording scanning wave; and stopping said reproduction of the waves after a predetermined number of counts.

The system utilized herein employs one small capacitor, and two substantially large capacitors. During <u>write</u> (recording) time period, the small capacitor is charged in positive direction with a linear rising potential for the production of the <u>write</u> scanning wave. During this <u>write</u> time period, the second capacitor is charged in positive direction with a linear but larger rising potential, and is isolated from the first. During this same period, the third capacitor is charged in negative direction with a linear but larger rising potential, and it is also isolated from the first. At the end of this write time period, further charging of the three capacitors is stopped, and the stored charges in the two large capacitors are utilized as alternate charging and discharging potential for the small capacitor, for the production of forward and backward scanning waves repeatedly during read time period. This condition is achieved by connecting the small capacitor to the two large capacitors alternately, in series with proper timing resistors, at a predetermined conversion frequency. The timing of these alternate connections is so arranged that the positively charged small capacitor is first connected to the negatively charged large capacitor, so that its charge will start failing to zero value linearly due to the larger potential across the larger capacitor than had been stored in the smaller capacitor. At the exact instant that the voltage across smaller capacitor has fallen to zero value, it is switched to the positively charged large capacitor to acquire a positively rising linear potential. In the previous mode, the positively rising potential in the small capacitor is linear due to the proportionally larger potential stored in the large capacitor. At the instant that the voltage in small capacitor has reached the same amplitude that it had acquired during write time period, it is again switched to the negatively charged large capacitor, and repeatedly on, until a timing element stops further oscillation. These exact timings are easily controlled by a fixed conversion-frequency oscillator, and prefixed resistance capacitance time constant adjustments.

The particular novel features of the present invention are represented by the novel electrical circuitry, the features of which will now be described in the following specification, in connection with the accompanying drawings, wherein: FIG. 1 is a schematic diagram in accordance with the invention; and FIG. 2 is a graph of waveforms involved in describing the arrangement of FIG. 1.

Figure 2:
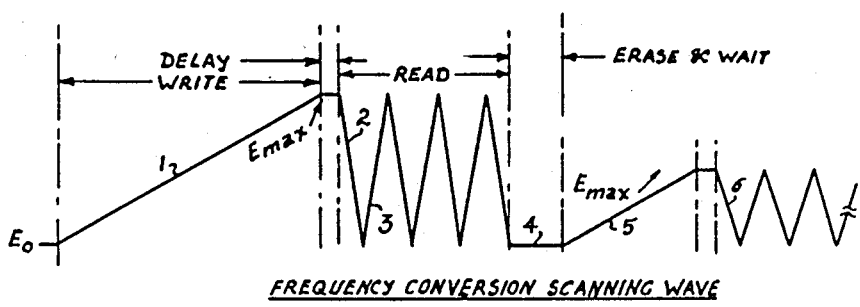

Referring now to FIG. 2, the scanning waveform illustrates the mode of recording and reproducing a complex waveform. The sweeping wave 1 represents the recording, or write, saw tooth voltage, rising from zero voltage level to a maximum voltage level $E_{max}$. After the complex wave is recorded during write period, symmetric saw tooth voltage waves 2, 3, etc. are produced during reproduction, or read period, at repetition of a reference conversion frequency rate. The fall 2 and rise 3 of these symmetric saw tooth voltages are produced in equal amplitudes as of the saw tooth voltage wave 1, and their maximums and minimums coincide exactly with that of zero and $E_{max}$. After a predetermined number of read saw tooth voltages are produced, they are stopped during waiting period 4, until a new writing saw tooth voltage 5 is produced, the latter of which may have a different amplitude than the voltage of 1; the rate of rise of voltages 1 and 5, however, being always constant. After the writing scan voltage 5 is produced, the read scan voltages 6 follow in the previously explained manner. Due to certain inherent characteristics of the circuitry shown in FIG. 1, a slight variable delay is introduced between the ending of write period and the beginning of read period, as indicated in the graphical illustration in FIG. 2. Such a delay, however, has no effect upon the operation of the system, and accordingly, it will be considered as inconsequential.

With the brief explanation of the presently disclosed scanning system, by way of the graphical illustration in FIG. 2, reference is now made to the schematic arrangement in FIG. 1, wherein the scanning voltage waves are produced across capacitor C1. This capacitor is normally connected to a slave capacitor C2 by way of a normally conductive switching transistor Q1. During write period, the capacitor C2 is charged in positive direction linearly across battery B1, in series with a timing resistor R1, and transistor Q2. Since the switching transistor Q1 is in on-position during this write period, the capacitor C2 acts as a slave driver of capacitor C1, so that the latter acquires a simultaneous rising charge. At the end of said write period, the transistor Q1 is rendered inoperative, and the capacitor C1 is isolated from C2, so that the former receives discharging and recharging potentials from driver capacitors C3 and C4. During write period, the capacitor C4 is charged in positive direction linearly across battery B1, in series with a timing resistor R2, and transistor Q3. Simultaneously in this period, the driver capacitor C3 is charged in negative direction linearly across battery B2, in series with timing resistor R3, and transistor Q4. The values of capacitors C3 and C4 are chosen to be higher than the value of capacitor C1, for example, they may be 1000 times larger, or more, than capacitor C1. The slave capacitor C2 is also chosen to be larger than C1, but not necessarily as large as C3 and C4. The charging rates of these capacitors are so preadjusted by the timing resistors R1 to R3 that, the capacitor C4 is not charged more than 60% of the voltage at the tap on battery B1, during the longest write period that may occur in a particular practice. Also during this period, the capacitor C3 does not charge more than 60%, or less than 30% of the potential at the tap on battery B2. Similarly, the timing for C2 is so adjusted that it does not charge more than 60% of the voltage charged in capacitor C4. These given percentages, of course, are approximate, and they are solely for effecting linear charges across said capacitors. With the conditions just given, it is assumed that during write period the transistors Q1 thru Q4 are rendered conductive, so that the capacitors C1 thru C4 charge linearly from zero potential, at the specified charging rates. During this write period, the NPN transistor Q5 and PNP transistor Q6 are switched in on-and-off operating conditions alternately, at a conversion frequency by the alternate voltages induced in the secondary coil L2 by the primary coil L1 of transformer T1, to which is applied alternate square waves by the square wave generating block 7. The switching square wave voltages across coil L2 are applied to the base elements of Q5 and Q6 in parrallel. But since the base elements of transistors Q5 and Q6 are oppositely polarized, they are switched to on-and-off states in alternate sequence. The purpose of transistors Q5 and Q6 is to provide alternate conductive paths between the capacitors C1 and C3, and C4, in series with the switching NPN transistors Q7 and Q8. But during write period, the transistors Q7 and Q8 are rendered inoperative, and accordingly, the capacitor C1 is isolated from capacitors C3 and C4; except from C2 by way of conductive transistor Q1.

At the end of write scanning period, the transistor Q1 is rendered inoperative, so that the capacitor C1 is isolated, to be switched alternately to the capacitors C3 and C4. At this point, it will be noted that the capacitor C1 is charged positively, and must be switched to the negatively charged capacitor C3 first, so as to effect discharge of C1 to zero value in series with the timing resistor R4. The oscillatory generation in block 7 is continuous, and therefore, a coincidence gate is included, so that the switching transistors Q7 and Q8 are switched in on-position at the instant that the PNP transistor Q6 assumes conductance. This coincidence gate comprises an amplifier transistor Q9, and two series connected gate transistors Q10 and Q11. the base elements of Q10 and Q11 are normally backward biased by battery B3; so that current flows through their collector circuit resistance R5 only when the base elements of both transistors Q10 and Q11 are simultaneously driven to forward biases. A split secondary coil L3 of transformer T1 assumes similar square voltages as in coil L2. The square wave voltages in coil L3 are differentiated into narrow pulses by a small coupling capacitor C5, and applied upon the base element of amplifier NPN transistor Q9. The coil L3 is so poled with respect to coil L2 that, the base element of Q9 receives positive pulses at the exact operating points of switching transistor Q6. These pulses are amplified in negative polarity in the collector circuit resistor R6 of Q9, and applied upon the base element of gate transistor Q10, via coupling capacitor C6 and load resistor R7. At the end of write scanning period, the one-shot multivibrator in block 8 is excited. A one-shot multivibrator is a trigger circuit, which when excited, it changes its state of conductance and remains in such state for a predetermined period of time, as preadjusted by a capacitor contained therein, whereupon it returns back to its original state of conductance. The change from one state to the other is extremely fast in these devices, and these devices are commonly used in the art of electronics. Accordingly, it is not necessary herein to include complete detail of one-shot trigger circuits, for simplicity of drawing and specification.

Referring to the one-shot circuit in block 8, it was mentioned to have been excited at the end of the write scanning period. This one-shot circuit is so adjusted that once it is excited, it produces an output pulse having a duration equal to one square wave, or longer, as generated in the oscillator block 7. The output pulse of block 8 is applied in negative polarity upon the base element of PNP transistor Q11, preparing the gate ready to operate when a negative pulse arrives upon the base element of PNP transistor Q10. Thus at the exact instant that Q6 becomes conductive, the gate, comprising Q10 and Q11, becomes conductive, and a pulse voltage from across resistor R5 is applied to the input to another one-shot trigger circuit in block 9. The one-shot trigger in block 9 is so adjusted that it produces an output pulse having a duration equal to a predetermined number of square wave cycles of the oscillation in block 7. This output pulse from a one-shot trigger in block 9 is applied in negative polarity upon the base element of a normally back-biased PNP transistor Q12, which becomes conductive and passes current through the primary coil L4 of transformer T2. The split secondary coils L5 and L6 of transformer T2 are instantly induced with voltage energy, which drive the base elements of transistors Q7 and Q8 to forward conductance, and thus connect the capacitor C1 to capacitors C3 and C4, alternately at the oscillatory frequency in block 7, in series with the timing resistor R4, and the fine adjusting resistors R8 and R9. During this operation, the output negative pulse from one-shot trigger in block 9 is also applied to the base element of PNP transistor Q13, so that it simultaneously energizes the primary coil L7 of transformer T3 and induces a square wave voltage in the secondary coil L8; the latter voltage rendering Q1 non conductive from its normally conductive state by the forward bias that it had originally received upon its base element from battery B4.

Since the two large capacitors are utilized as the driver voltage sources for the small capacitor, the ratio of capacitance values between the large and small should be high, so that discharge of the large capacitors during charge of the small capacitor will be negligible. For practical purposes, however, the size of the large capacitors is limited, and accordingly, the small capacitor will represent as high impedance with respect to the associated electrical parts of the circuit; especially when transistors are used in the arrangement. Thus, as a novel circuit arrangement in the present disclosure, the small capacitor is connected to an auxiliary charging large capacitor during production of the recording saw tooth wave, so that the charges and discharges across the small capacitor are always dependent upon large slave capacitors during production of both recording and reproducing saw tooth waves.

During the long output pulse voltage from one-shot trigger circuit in block 9, the capacitor C1 is connected to the capacitors C3 and C4 in alternate sequence. Assuming that C1 is first connected to C3, the voltage of C1 must drop toward negative direction. The series resistances R4 and R8 are so adjusted that the voltage across C1 reaches to zero value at the exact instant as the PNP transistor Q6 is switched off, and the NPN transistor Q5 is switched on. At this given instant, the capactior C1 must now start charging in the positive direction. Here again, the series resistors R4 and R9 are so adjusted that, the NPN transistor Q5 is switched off at the exact instant when the voltage in C1 has reached the same amplitude as it had assumed during recording (write) time period, and so on. To achieve such accuracy, the oscillator in block 7 must be stable, which condition is easy to obtain by a crystal oscillator.

When the output pulse from the one-shot trigger circuit in block 9 drops to zero, indicating the end of read period, it produces an output narrow pulse, which is applied to a set-and-reset trigger circuit in block 10, the latter of which applies forward bias voltages to the base elements of normally inoperative transistors Q14, Q15, Q16 and Q17, rendering them conductive. The collector and emitter elements of transistors Q14 thru Q17 are connected in parallel with the capacitors C1 thru C4, respectively, so that when these transistors become conductive, they discharge said capacitors. By choosing the proper transistors, fast discharge of the capacitors may be performed. When a following write scanning wave starts, the set-and-reset trigger in block 10 is shifted to set position, and the transistors Q14 thru Q17 become non conductive, for the new start.

Referring to the capacitors C1 and C2, it will be noted that the capacitor C2 could be eliminated, and C1 charged in series with resistor R1 during production of the write scan wave. As described in the foregoing, the capacitor C1 is assumed to have small capacitive value, and accordingly, the resistor R1 would have to have large resistive value. While transistors are good on-and-off switching devices, their cut-off characteristics are not ideal, and accordingly, transistors cannot offer complete isolation of the small capacitor from the charging large capacitors during write scan period. For this reason, and in accordance with the novel features of the present invention, the large slave capacitor C2 (with R1 having small resistive value) is included as an aid to the small capacitor C1, to overcome any damping of the rising voltage during reproduction of the write scan saw tooth voltage.

Having described the main features of the arrangement in FIG. 1, the minor details not mentioned are familiar to the skilled in the art. For example, the capacitor C1 may be of high impedance, and it may be necessary that its output is taken from a cathode follower, using a vacuum tube V1, and the output taken from the cathode circuit resistor R10. The resistors R11 thru R24, and R41, are connected in series with the base elements of the transistors mentioned, as current limiters, to prevent injury to the transistors by overdrive. The base element of Q9 is connected to ground in series with the load resistor R25, without biasing applied to it, as only input pulses of positive polarity are utilized for its operation. The resistor R26 is included in the emitter circuit of Q9 to limit its gain, and accordingly, it may be dispensed with. In actual practice, the primary coils of transformers T1, T2 and T3 (or secondaries if necessary) should be shunted by resistors of proper matching values, to improve the shape of square wave outputs.

During recording (write) time period, the capacitors C1 thru C4 are charged by transistors Q2, Q3 and Q4. These transistors are rendered conductive by two set-and-reset flip-flop circuits; the first comprising NPN transistors Q18, Q19, and the second comprising PNP transistors Q20, Q21. Any one of these flip-flop circuits is arranged with direct cross coupling, so that when one of the transistors is in a state of conductance, the other is in a state of non-conductance. For example, when Q18 is conducting, the voltage drop across its collector circuit resistor R27 is directly applied upon the base element of Q19, as backward bias, in series with resistor R28, and across load resistor R29, driving Q19 to non-conductive state. Similarly, when Q19 is in conductive state, the voltage drop across its collector circuit resistor R30 is applied upon the base element of Q18, in series with resistor R31, and load resistor R32, driving Q18 to non-conductive state. It will be noted that the voltage at base elements of either Q18 or Q19 cannot reach zero, or reverse to negative voltage for complete cut-off of these transistors. The feedback resistor R33 in the emitter elements of these transistors is helpful in reducing the minimum current passing through the idle transistor. The bypass capacitor C7 across resistor R33 may be dispensed with, if so desired, as the circuit will also operate without it. The flip-flop circuit comprising transistors Q20 and Q21, is similar to the flip-flop just described, and the resistors R34 to R40 (also the bypass capacitor C8), are numbered in the same order as in the former, for description reference. The only difference in the two flip-flop circuits is the use of NPN and PNP transistors, in which case, the former requires positive potential upon the collector elements, as received from battery B1, and the latter requires negative potential upon the collector elements, as received from the battery B2. Since these flip-flop circuits are set-and-reset trigger circuits, the circuit in block 10 may be of similar type.

With regard to the functional operation of the flip-flop circuits, as described supra, assume that at the beginning of write (recording) period a positive pulse is applied to the terminal A, and a negative pulse is applied to the terminal B, which drive the base element of transistor Q18 positive, and the base element of Q20 negative, through coupling capacitors C11 and C12. Both the NPN transistor Q18 and PNP transistor Q20 become conductive in stable states. Conduction of transistor Q18 applies negative forward-bias upon the base elements of PNP transistors Q2, Q3, and conduction of Q20 applies positive forward-bias upon the base element of the NPN transistor Q4. Thus, the transistors Q2 to Q4 start charging the capacitors C1 thru C4. At the end of write period, positive and negative pulses are applied to the terminals B and A, respectively, which drive the transistors Q19 and Q21 into stable conductance, and the transistors Q2 to Q4 are switched off, stopping further charge of the capacitors C1 thru C4. At this point, the conducting transistor Q21 applies an operating signal upon the one-shot device in block 8, for its operation, and start the read scanning, as described in the foregoing.

At the beginning of write period, the operating transistor Q20 applies a signal upon the set-reset trigger in block 10, so that it is driven to reset position for rendering the capacitor discharging transistors Q14 thru Q17 to non-conductance. If the conductive states of discharging transistors Q14 thru Q17 is desired to be during a short period of time, then either a narrow pulse may be applied to forward bias the base elements of these transistors, or the device in block 10 may be changed to a one-shot device; cancelling the coupling from transistor Q20.

In reference to the production of read scan waves, it was stated that the positively charged capacitor C1 should first be connected to the negatively charged capacitor C3, by the PNP switching transistors Q6 and Q8. Due to the continuous state of oscillation of the oscillator in block 7, however, the coincidence gate comprising transistors Q10 and Q11 had been included. This coincidence gate, the amplifier transistor Q9, the coil L3 of transformer T1, and the one-shot circuit in block 8 may be eliminated when the oscillator in block 7 is shock excited, instead of being in continuous state of oscillation. For example, the signal voltage from resistor R37 may be applied simultaneously to both one-shot circuit in block 9, for its operation, and the oscillator in block 7 for shock excitation. The secondary coil L2 of transformer T1 may then be so poled that, it will commence with a negative voltage at the start of shock oscillation of the oscillator in block 7. Shock oscillation of an oscillator is commonly known and practiced in the art of electronics.

According to the descriptive matter of the operation of the circuit arrangement given in FIG. 1, regarding the various changes that may be made without changing the original function of the system, it is then assumed that various modifications, adaptations and substitutions may be made without departing from the true spirit and scope of the invention.

What is claimed, is:

1. Apparatus for generating a first scanning wave linearly rising in amplitude from a first reference level to a second reference level in a given time interval, and generating a succession of equally defined second scanning waves alternately rising and falling at equal predetermined constant rates from said first reference level to said second reference level, and vice versa, the apparatus comprising the following parts: First and second voltage sources having opposite polarities; a normally idle first gate, a series connected first capacitor and a first resistor having a first time constant, connected across the first voltage source in series with the first gate; a normally idle second gate, a series connected second capacitor and a second resistor having a second time constant, connected across the second voltage source in series with the second gate; a normally idle third gate, a series connected third capacitor and a third resistor having a third time constant, connected across the second voltage source in series with the third gate, said third time constant being at least thirty percent shorter than said second time constant; a fourth capacitor and a normally operating fourth gate connecting the fourth capacitor in parallel with the third capacitor, the capacitive value of said fourth capacitor being substantially lower than any one of the first, second and third capacitor, and low enough as not to appreciably affect said third time constant; a series connected fourth timing resistor and a fifth gate coupled to said first capacitor; a series connected fifth timing resistor and a sixth gate coupled to said second capacitor; a generator of alternate square wave at a frequency of said predetermined constant rates; means for energizing said fifth and sixth gates alternately by last said generated waves; a normally idle seventh gate connected between said fourth capacitor and common to said fifth and sixth gates in series with the fourth and fifth timing resistors; a first transformer having a primary winding and a secondary winding connected to said fourth gate; a second transformer having a primary winding and at least one secondary winding connected to said seventh gate; means for energizing said first, second and third gates in steady states in said given time interval, thereby said first, second, third and fourth capacitors charging with linear rise in accord with said prescribed time constants; means for utilizing the rising charge across said fourth capacitor as said first scanning wave; means for de-energizing said first, second, third and fourth gates at the end of said given time interval, thereby stopping further charges across last said capacitors; and means for applying a square energy wave to the primary windings of said first and second transformers for de-energizing said fourth gate and energizing said seventh gate by induced similar square energy waves across said secondary windings, thereby connecting the fourth capacitor through said seventh gate to the oppositely charged first and second capacitors alternately at said predetermined constant rates in series with said fifth and sixth gates and said fourth and fifth timing resistors, for the reproduction of said succession of alternate scanning waves across the fourth capacitor.

2. The apparatus as set forth in claim 1, wherein is included means for discharging said first, second, third and fourth capacitors prior to production of said first scanning wave.

No references cited.